United States Patent
Markus et al.

[15] 3,692,975
[45] Sept. 19, 1972

[54] FOOD PREPARING SYSTEM FOR PASSENGER CARRYING CONVEYANCES

[72] Inventors: Joseph Markus, 51 Ash Lane, Hicksville, N.Y. 11801; James H. Rowe, 129 Greenway West, New Hyde Park, N.Y. 11040; Kenneth L. Dew, 30-26 Grunstra Place, Fairlawn, N.J. 07410; Edward J. Mystowski, 363 Howard St., Westwood, N.J. 07675

[22] Filed: March 26, 1971
[21] Appl. No.: 128,317

[52] U.S. Cl. ................219/202, 99/357, 99/400, 219/387, 219/412, 219/478, 219/488
[51] Int. Cl. ........................................B60l 1/08
[58] Field of Search......219/202, 218, 279, 385, 386, 219/387, 405, 411, 412, 472, 475, 476–480, 488, 520–522, 523, 526; 312/236; 99/339, 385, 389, 357, 400; 307/9, 10 R

[56] References Cited

UNITED STATES PATENTS

| | | |
|---|---|---|
| 3,521,030 | 7/1970 | Maahs.......................219/202 |
| 3,074,342 | 1/1963 | Wachtel......................99/339 |
| 2,944,134 | 7/1960 | Kenyon..................219/386 X |
| 2,584,435 | 2/1952 | Doerr.....................312/236 X |
| 3,440,398 | 4/1969 | Nilssen.......................219/279 |
| 3,571,560 | 3/1971 | Nilssen et al. .............219/279 |
| 3,469,073 | 9/1969 | Zechin..................219/202 X |
| 3,586,099 | 6/1971 | Collie.........................219/202 |

*Primary Examiner*—J. V. Truhe
*Assistant Examiner*—B. A. Reynolds
*Attorney*—Gerald Durstewitz and I. Allen Strombeck

[57] ABSTRACT

A food preparing system incorporated into an automobile for use in connection with food products of the type designed to be prepared by heating in a conventional household toaster. The system includes a console which containing a toaster and a food storage unit and is positioned adjacent the instrument panel of the automobile over its transmission and drive shaft hump, and a regulated electrical generating system driven by the automobile's engine and integrated into the conventional electrical system thereof.

6 Claims, 18 Drawing Figures

PATENTED SEP 19 1972 3,692,975

INVENTORS
JAMES H. ROWE
JOSEPH MARKUS
KENNETH L. DEW
EDWARD J. MYSTOWSKI

BY

PATENT AGENT

INVENTORS
JAMES H. ROWE
JOSEPH MARKUS
KENNETH L. DEW
EDWARD J. MYSTOWSKI

BY

PATENT AGENT

INVENTORS
JAMES H. ROWE
JOSEPH MARKUS
KENNETH L. DEW
EDWARD J. MYSTOWSKI

BY

PATENT AGENT

FOOD PREPARING SYSTEM FOR PASSENGER CARRYING CONVEYANCES

BACKGROUND OF THE INVENTION

The present invention relates to electrical food preparation systems, and, more particularly, to such systems which are incorporated into passenger carrying conveyances and receive power from the engine driving the conveyance.

In recent years, there has been a vast increase in the number and variety of foods available on the market which are designed to be prepared quickly and with a minimum of effort. These convenience foods may be divided into four general types or classes: (1) precooked foods which are prepared by heating in an oven such as precooked frozen meat courses and dinners; (2) precooked foods which require heating in a pot for example canned soups and vegetables; (3) quick cook or instant foods which require the addition of boiling water to the food product such as instant hot breakfast cereals, instant rice dinners, soup and gravy mixes, and instant coffee; and (4) those which are prepared by heating in a toaster such as frozen waffles and pancakes and certain pastries and pizzas.

It will be appreciated, that in order to provide a complete, well balanced and varied diet using the available convenience foods, it is necessary to employ an oven, stove top burners, pots, a can opener, and a toaster. Of course, this is no problem in the home, however, the only way in which the traveling public can utilize these convenience foods is to carry with them the equivalent of a small scale kitchen. Such facilities are usually provided in the larger vacation conveyances (boats, motor homes, and the like) which are designed to be lived in while traveling. However, those traveling in smaller conveyances such as automobiles are restricted to using a portable gasoline or bottled gas stove. This arrangement has many disadvantages. Such portable stoves are equipped with only top burners and therefore many of the convenience foods cannot be prepared on them. In an automobile, the stove, pots, and ice chest (for food storage) usually must be carried in the trunk thus reducing luggage space. The stove cannot be used inside the auto and therefore meals can be prepared only when parked in suitable areas and then only when the weather is fair and reasonably warm. Therefore, as a practical matter, the vast majority of motorists do not have the option of preparing their own hot meals while traveling.

Recently, packages have been developed by means of which most of the foods falling within each of the four previously mentioned types or classes of convenience foods can be prepared by merely inserting the package in a conventional household toaster and heating for a few minutes. These new packaging arrangements are fully disclosed in the following U.S. Pat. applications: Ser. No. 794,307, filed Jan. 27, 1969; Ser. No. 813,911, filed Apr. 7, 1969; and Ser. No. 57,521, filed July 23, 1970 all of which are assigned to the assignee of the present application.

The conventional toaster is designed to produce a very high temperature at the outer surfaces of a piece of bread so that these surfaces are browned before the moisture in the interior of the slice is driven off. Such high temperatures require the consumption of large quantities of electrical power. A conventional toaster will draw about 400 to 500 watts for each slice position within the toaster. Up to the present, electric toasters have been produced solely for use in the home and have been designed to operate on the normally available high voltage house current.

The electrically operated automobile accessories which have been available in the past have been designed to receive their power from the battery of the auto by direct connection to the existing electrical circuit. The most frequent method of connection is by use of a special plug which fits into the auto's cigarette lighter. Those available accessories which contain heating elements include devices for heating baby bottles such as those shown in U.S. Pat. Nos. 1,604,972; 2,079,611; 2,277,605; and 2,518,538; and devices for heating bowling balls such as that shown U.S. Pat. No. 3,091,681. When such devices are connected and the engine of the automobile is not running, the accessory draws power directly from the battery. When the engine is running, it draws from the automobile's generator which produces varying voltage according to the engine speed, and the time required to heat the baby bottle or the bowling ball varies accordingly.

Such devices as bottle warmers can readily be powered directly from the electrical system of an automobile since the power they require is not great and the rate at which heating takes place is not critical. A toaster on the other hand cannot be powered directly from the electrical system of an automobile with satisfactory results since it requires too much power and the rate of heating is critical. A two slice toaster requires 800 to 1000 watts of electrical power to toast bread. If heating elements drawing this amount of electrical power were connected directly to a 12 volt auto battery, they would draw from 66 to 83 amperes and completely drain the battery in a few minutes. Since the articles within a toaster cannot be viewed, touched or removed to determine their condition (particularly if they are sealed within a package) it is essential that the rate of heating remain constant so that the desired condition of the article can be achieved by heating the article for a predetermined period of time. The voltage delivered to the heating elements must be constant if the rate of heating is to remain constant. The prior art systems referred to do not provide a constant voltage.

BRIEF SUMMARY OF THE INVENTION

In view of the foregoing it is an object of the present invention to provide a practical electrical food preparing system for passenger carrying conveyances.

Another object is to provide such a system including a single appliance for preparing a wide variety of convenience foods.

Another object is to provide such a system including a toaster for preparing a variety of foods sealed in toaster size packages.

Another object is to provide such a system including electrical generating apparatus driven by the engine of the conveyance and supplying large quantities of regulated electrical power.

Another object is to provide such a system which supplies constant power independent of the condition of charge of the battery which forms a part of the electrical system of the conveyance.

Another object is to provide such a system wherein the heating elements in the cooking unit are isolated from the battery.

The foregoing objects are accomplished by providing a system for a passenger carrying conveyance for preparing food requiring absorption of heat at a predetermined high rate for a predetermined time comprising cooking means in the passenger compartment of the conveyance for converting electrical energy to radiant heat energy and electrical generating apparatus driven by the engine of the vehicle for supplying constant voltage electrical power independent of the battery of the vehicle.

BRIEF DESCRIPTION OF THE DRAWINGS

A preferred embodiment of the invention has been chosen for purposes of illustration and description, and is shown in the accompanying drawings, forming a part of the specification, wherein.

DESCRIPTION OF THE PREFERRED EMBODIMENT

Referring now to the drawings in detail, there is shown a food preparing system in accordance with the present invention which generally comprises a portable toaster console unit 10 positioned within the passenger compartment of an automobile, an alternator 11 driven by the engine 12 of the automobile, and a solid state voltage regulator 14 for controlling the output of the alternator.

With reference to FIGS. 1 to 10, the console 10 includes a generally rectangular casing 15 in which are housed a food storage cabinet 16, an electric toaster 17, a bottle warmer 19, and a water jug 20.

Figure 1:
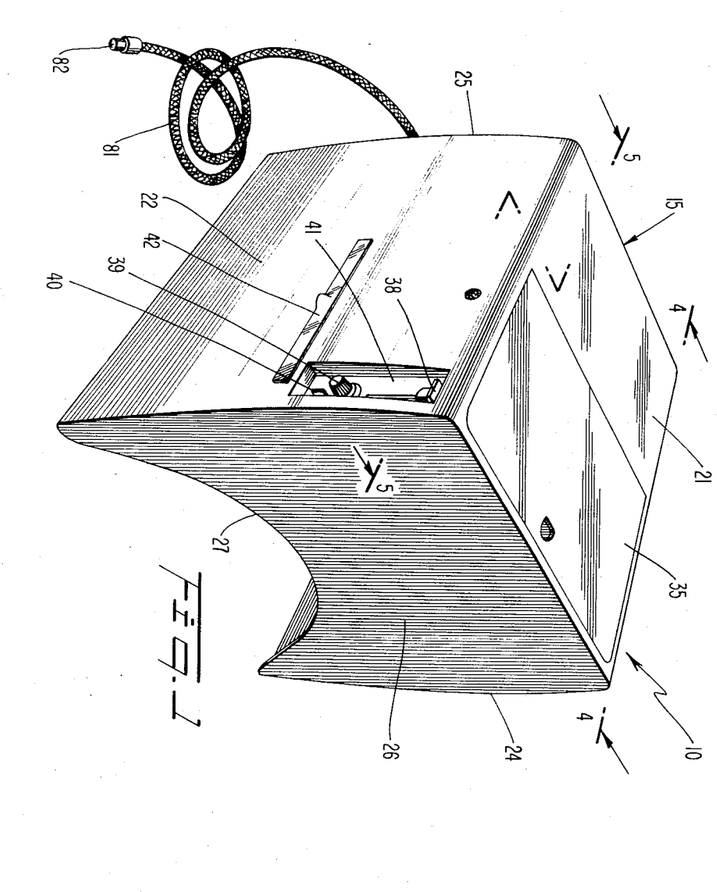
FIG. 1 is an isometric view of a toaster console for an automobile according to the present invention.
Figure 2:
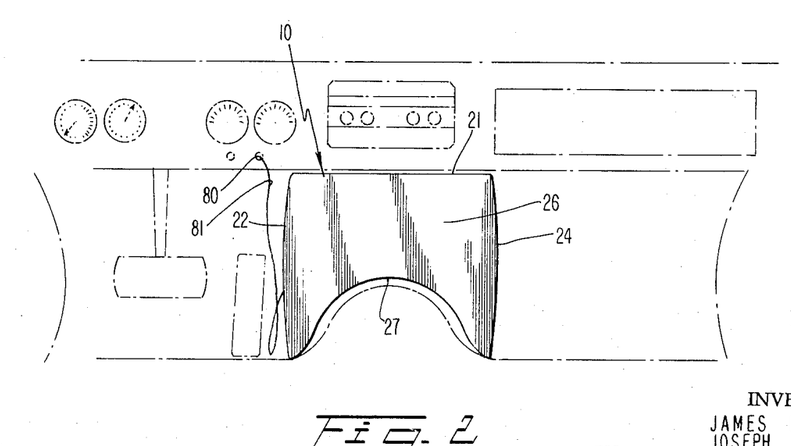
FIG. 2 is an elevational view of the console illustrating its position within an automobile.
Figure 3:
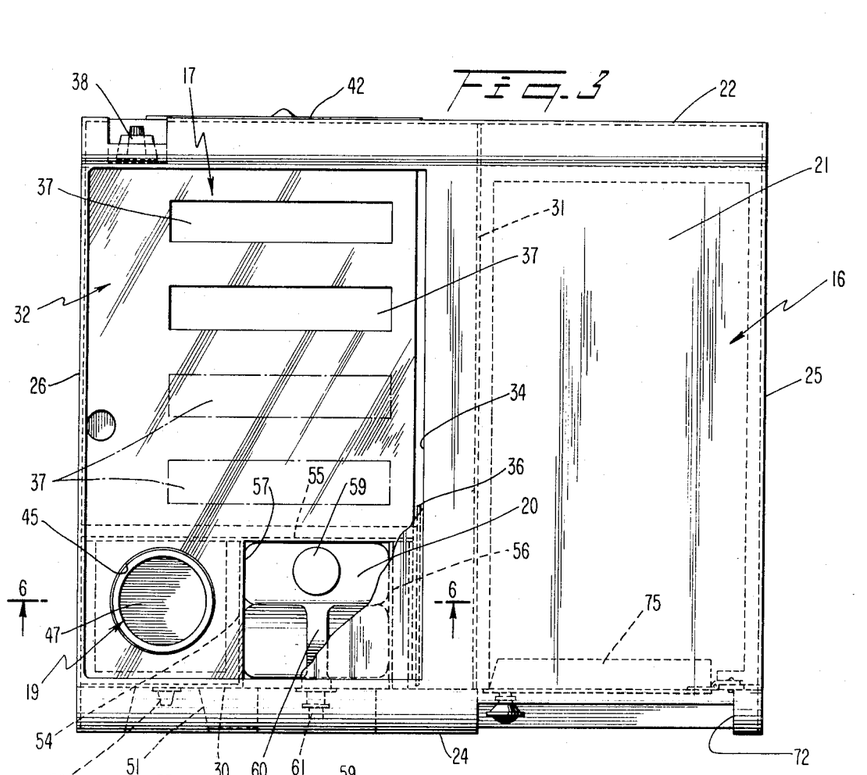
FIG. 3 is a plan view of the console.

The casing 15 includes a top wall 21, a left side wall 22, a right side wall 24, and end walls 25 and 26. The console is designed to be removably positioned on the floor of an automobile in the front seat area so as to partially extend under the instrument panel. The end walls 25 and 26 are each provided with a recess 27 for receiving the transmission-driveshaft hump as shown in FIG. 2. A horizontal bottom wall 28 is positioned above the recesses 27 and inner side walls 29 and 30 (FIG. 10) extend upwardly from the edges of the bottom wall 28. An interior dividing wall 31 (FIG. 3) extends vertically between the bottom wall 29 and the top wall 21 to separate the storage cabinet area from the rest of the console.

The top wall 21 is formed with a rectangular recessed area 32 beneath which the toaster, bottlewarmer, and water jug are positioned. An upwardly facing open ended trough 34 is formed in the top wall 31 along the edge of the area 32. A hinged cover plate 35 fits flush within the area 32 to overlie and conceal the toaster, bottlewarmer and jug. A rod 36 is secured to the underside of the cover 35 at the trough to act as a hinge. The rod 36 is longer than the trough and its ends extend past the ends of the trough and under the portions of the top wall 21 outwardly of the trough. When the cover 35 is pivoted to the open position it drops into the trough and is held in a generally vertical position. The console is positioned so that the cover, in its standing position, is close to the instrument panel and acts as a guard to protect the panel from any splash or splatter which might occur during food preparation.

The toaster 17 has two slice positions and is of conventional design except for the electrical characteristics of the heating elements. The heating elements and the food holding racks are mounted directly beneath the recessed wall portion 32 in alignment with elongated loading slots 37 provided in the wall portion 32. The food holding racks are lowered to place the packages to be prepared between the heating elements by downward motion of a knob 38 located on the left side of the console. In addition to lowering the racks, the operation of the knob also closes switch contacts to connect the heater elements to the electrical supply. Once depressed, the racks are latched in that position for a length of time selected by setting a knob 39 located beneath the knob 38. A release button 40 is also provided to unlatch the racks at any time. The racks are spring loaded to return to their upper position when unlatched.

The knobs 38 and 39 and the button 40 are positioned within a recess 41 formed in the left side wall of the console. A crumb tray 42 extends beneath the toaster elements to collect any particles which may fall from the articles being heated.

The bottle warmer 19 includes a cup shaped member 44 extending downwardly from a circular opening 45 in the wall portion 32, a heating element 46 embedded in a ceramic disc 47 positioned at the bottom of the member 44, and a ceramic cup 49 within the member 44 and resting on the disc 47. An on-off switch control knob 50 for energizing the element 46 is positioned in a circular recess 51 formed in the right side wall 24 of the console.

The water jug 20 is removably positioned within a compartment 52 formed by vertical walls 54, 55 and 56 extending downwardly from a rectangular opening 57 in the wall portion 32 to the bottom wall 28. The jug is of conventional design and is blow molded of plastic with a cap 59, a handle 60 and a push button type dispensing valve 61. The side wall 24 of the console is provided with a recess 62 and a vertical slot 64 within the recess through which the dispensing valve projects into the recess. The recess extends downwardly below the valve 61 a sufficient distance to accept a drinking cup. The inner wall 30 is interrupted between the compartment walls 54 and 56 to accommodate the valve 61 as the jug is slid into and out of the compartment 52. The jug rests on a base member 66 which is fastened to the compartment walls 54 – 56. The compartment 52 is surrounded by a layer of insulation 67.

Figure 4:
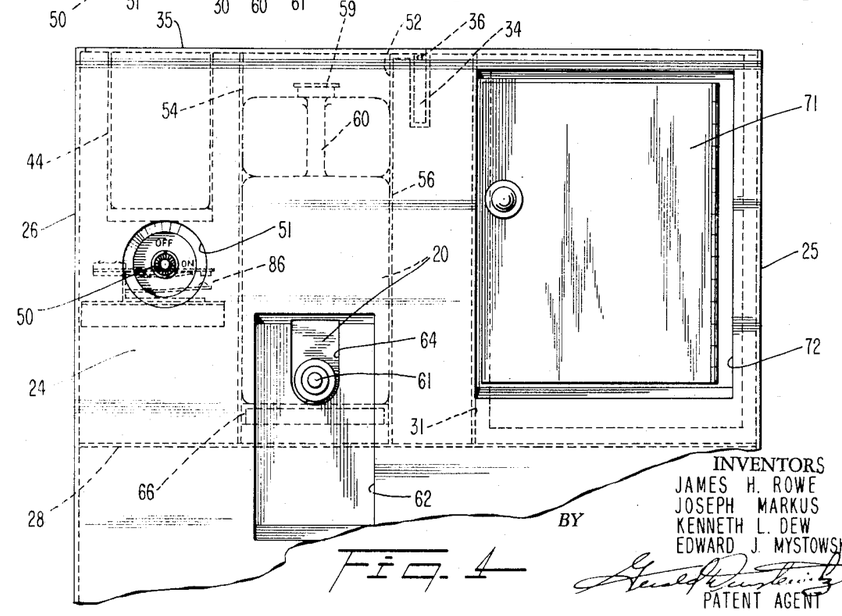
FIG. 4 is a right side elevational view of the console taken along the line 4—4 on FIG. 1.
Figure 5:
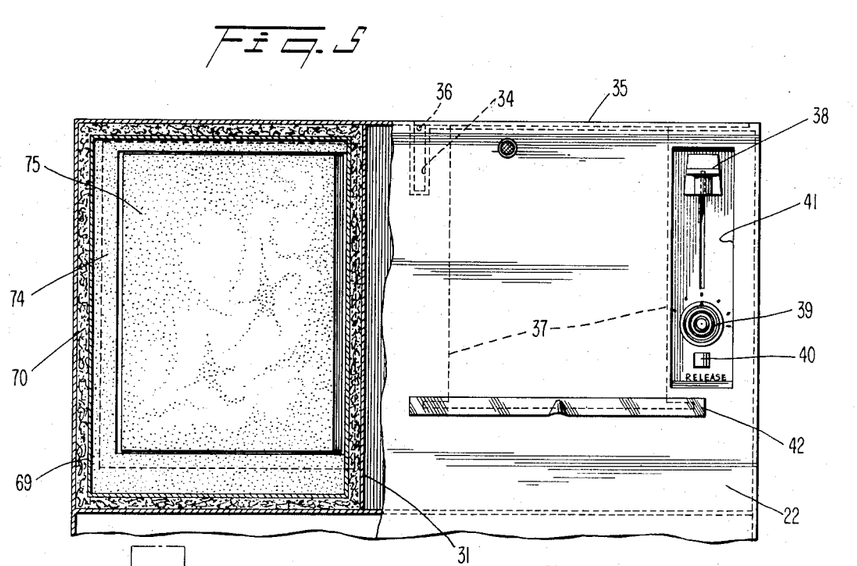
FIG. 5 is a left side elevational view of the console partly in section taken along the line 5—5 on FIG. 1.
Figures 6, 8:
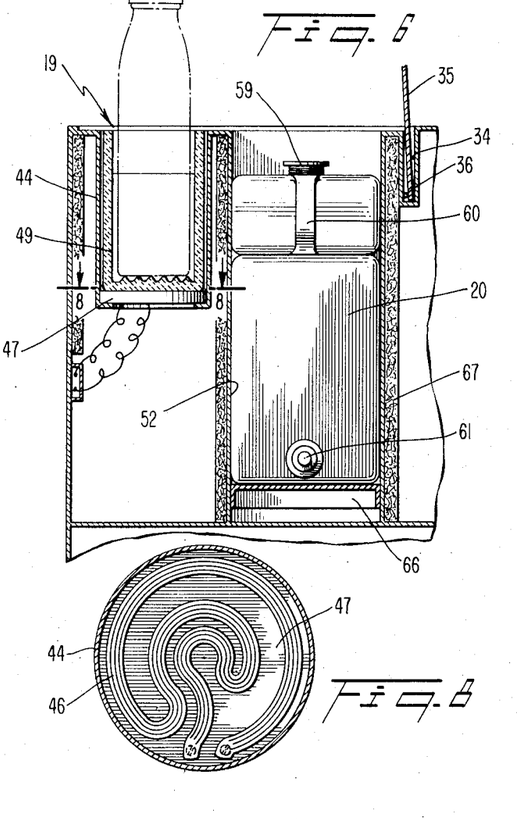
FIG. 6 is a sectional view taken along line 6—6 on FIG. 3.
FIG. 8 is a plan view of a heating element taken along line 8—8 on FIG. 6.
Figure 7:
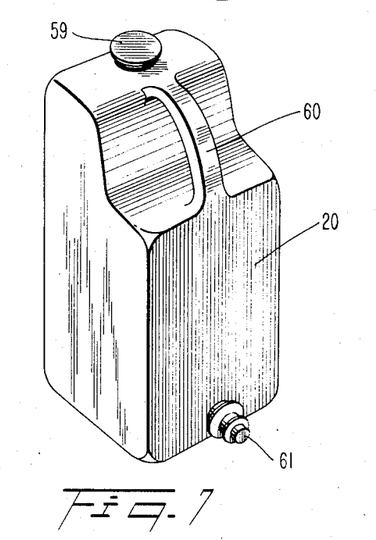
FIG. 7 is an isometric view of the water container shown in FIGS. 3, 4 and 6.
Figure 9:
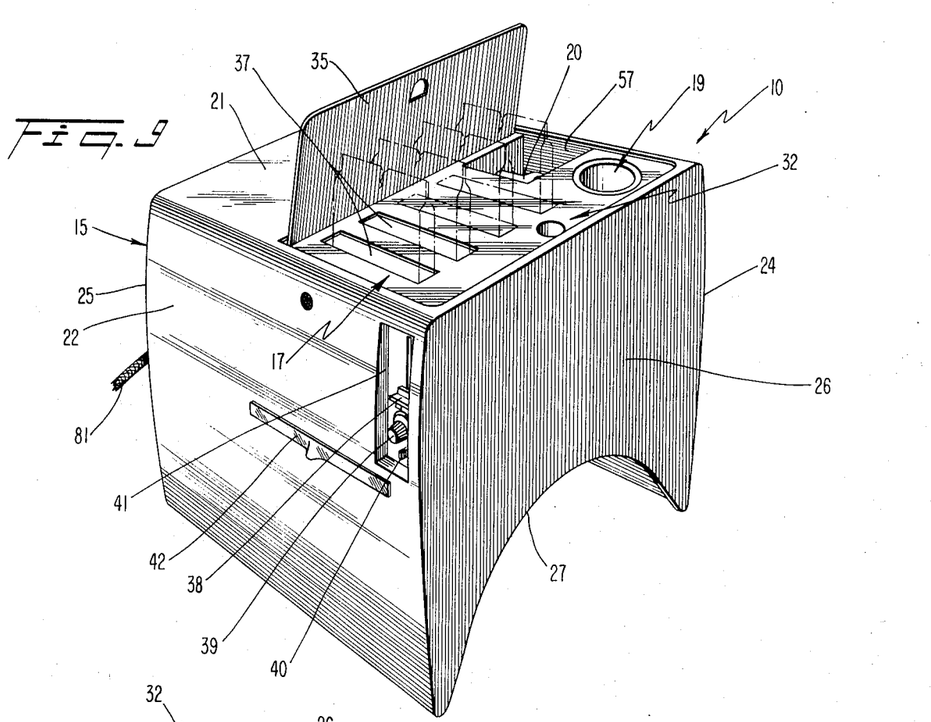
FIG. 9 is a view similar to FIG. 1 showing the console in use.

The storage cabinet 16 as shown in FIGS. 4 and 5 is provided with a liner 69 spaced from the console walls by a layer of insulation 70, and a door 71 positioned in the right side of the console within a recess 72 formed in the wall 24. The cabinet is further insulated by a styrofoam liner 74 positioned within the liner 69 and by a styrofoam layer 75 mounted on the door 71. The cabinet may be cooled by the use of ice, or by refrigeration cooling coils incorporated therein. The cooling coils could be connected to the automobile's air conditioner through hoses having valved detachable couplers. Alternately, an electrically driven refrigeration system could be built into the console and powered by the electrical apparatus powering the toaster 17.

The electrical generating apparatus for powering the console 10 is located within the engine compartment and is connected by cable to a four terminal outlet 80 mounted on the instrument panel. The console 10 is provided with a cable 81 having a four prong plug 82 for insertion into the outlet 80. The switch mechanism in the toaster, which is operated by the knob 38, has a set of contacts 84. The switch mechanism in the bottlewarmer which is operated by the knob 50, has a set of contacts 86. The toaster contains a heating network 88 which comprises a plurality of heater elements 89 connected in parallel, and has a total resistance at room temperature of ½ ohm.

Figure 11:
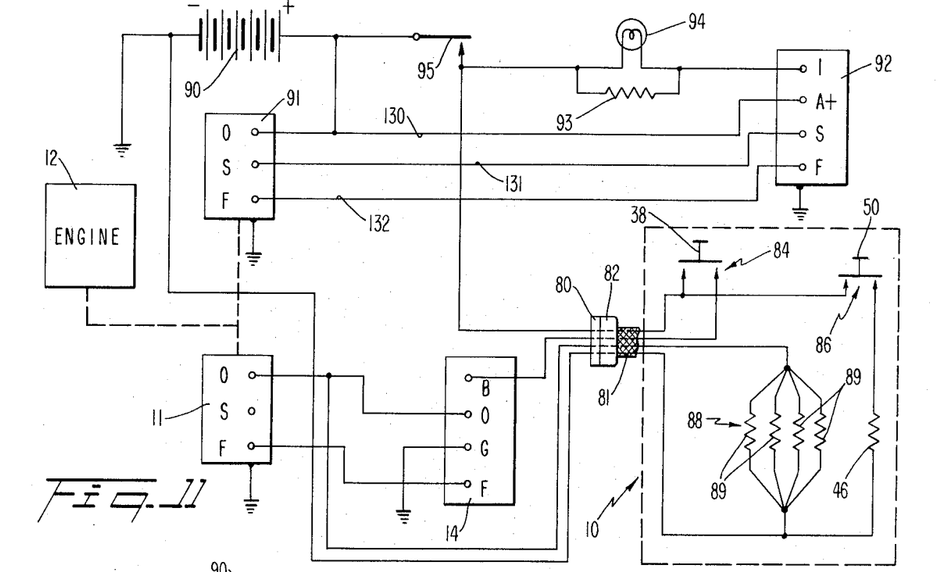
FIG. 11 is a schematic wiring diagram of a system in accordance with the present invention interconnected with the electrical system of an automobile provided with a charge indication lamp.

With reference to FIG. 11, the electrical system of the automobile includes a rechargeable storage battery 90 for starting the auto and supplying power to the ignition system thereof, an alternator 91 driven by the engine 12 for recharging the battery, an electro-mechanical voltage regulator 90 or 92 for adjusting the rate at which the battery is charged, a resistor 93 with a neon lamp 94 connected in parallel therewith to indicate when the battery is being discharged, and a pair of accessory contacts 95 on the ignition switch of the automobile. The heater element 46 of the bottle warmer is of conventional design and is connected in series with the contacts 86 between the contacts 95 and electrical ground so as to receive power from either the battery 90 or the alternator 91 when the switch contacts 95 are closed.

Figures 13, 14, 15:
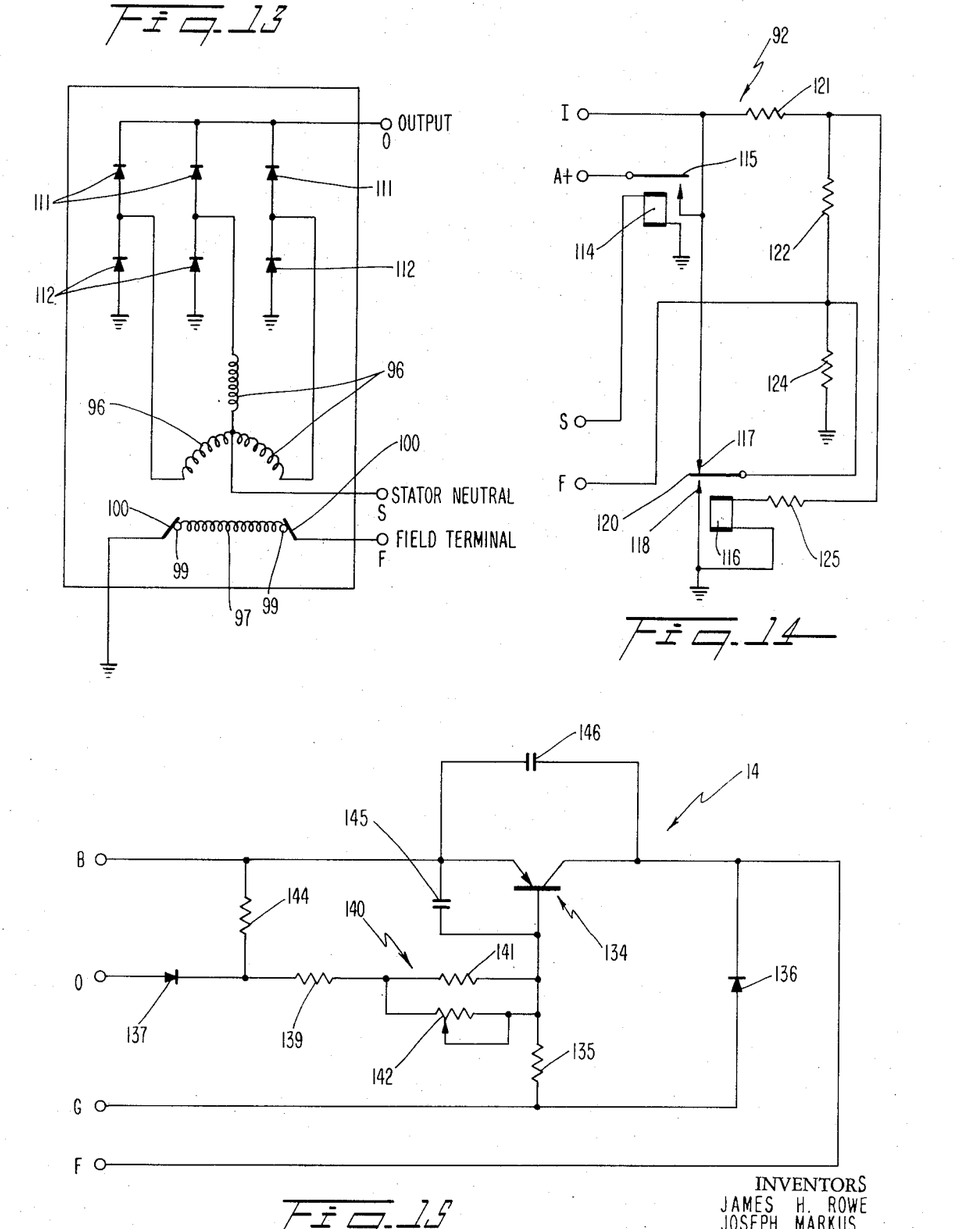
FIG. 13 is a schematic diagram of a conventional automotive alternator.
FIG. 14 is a schematic diagram of a conventional automotive voltage regulator.
FIG. 15 is a schematic diagram of a solid state voltage regulator which forms a part of the present invention.

As shown in FIG. 13 each of the alternators 11 and 91 include three stationary output windings 96 which are 120° out of phase with each other and are positioned on the stator (housing) of the alternator, a rotating field winding 97 carried by the rotor (armature), a pair of slip rings 99 on the rotor and a pair of brushes 100 on the stator to provide connection to the field winding. A diode 111 connects one end of each of the windings 96 to the output terminal "0," while a diode 112 connects electrical ground to that same end of the windings 96. The other ends of the windings 96 are each connected to the stator neutral terminal "S." The field winding 97 is connected between electrical ground and the field terminal "F" by the slip rings 99 and the brushes 100.

The electro-mechanical regulator 92 is shown in detail in FIG. 14 and includes a field relay having a coil 114 and contacts 115; a regulating relay having a coil 116, stationary contacts 117 and 118, and a moveable contact 120; a 0.04 ohm resistor 121; a 10 ohm resistor 122; a 50 ohm resistor 124 and a 14 ohm resistor 125. The resistors 121, 122 and 124 are connected in series between the indicator lamp terminal I and electrical ground. The coil 116 is connected in series with the resistor 125 between electrical ground and the junction of resistors 121 and 122. The moveable relay contact 120 is connected to the field terminal F and to the junction of resistors 122 and 124. The contact 117 is connected to the terminal I and the contact 118 is connected to electrical ground. The relay coil 114 is connected between the stator terminal S and electrical ground while the contacts 115 are connected between the battery terminal A+ and the terminal I.

With reference again to FIG. 11, the terminal I of the regulator 92 is connected to the positive terminal of the battery through the resistor 93 and the ignition switch 95. The A+ terminal of the regulator is connected to the positive terminal of the battery and the output terminal of the alternator 91 by means of a conductor 130. The stator and field terminals of the regulator are connected to the stator and field terminals of the alternator by conductors 131 and 132 to complete this circuit arrangement.

When the accessory contacts 95 of the ignition switch are closed, current flows from the battery to the field winding of the alternator 91 via the resistor 93, the relay contacts 117 and 120 and the conductor 132. The indicator lamp 94 lights when current is being drawn from the battery through the resistor 93. At normal engine speeds the output at the terminal S of the alternator is sufficient to energize the field relay coil 114 and close the contacts 115 to interconnect the terminals I and A+ and short circuit the resistor 93 and the lamp 94. With the contacts 115 closed, the current flow to the field winding 97 of the alternator 91 is supplied by the alternator output at the terminal O through the conductor 130 and the contacts 115. Current also flows from the alternator terminal O through the battery 90 to ground to recharge the battery. When the charge in the battery is low, a major portion of the alternator output current flows through the battery. As the charge in the battery builds up, its effective resistance to the charging current increases and more of the alternator output current flows through the parallel paths formed by the resistors 122 and 124 and by the resistor 125 and the relay coil 116.

When the battery voltage reaches a predetermined value, the current flowing through the coil 116 is sufficient to move the contact 120 against the contact 118 to remove all current from the field winding. The alternator output drops off as the magnetic field collapses and the contact 120 moves against the contact 117. This cycle is continuously repeated so that the contact 120 vibrates between the contacts 117 and 118. The average output of the alternator is thus limited so that the battery receives only a trickle charge after it is brought to a fully charged condition.

Referring now to FIG. 15, the solid state voltage regulator 14 includes a PNP type power transistor 134, the emitter − collector circuit of which is connected between a terminal B (for connection to the positive terminal of the battery) and a terminal F (for connection to the alternator field winding). The base of the transistor is connected by means of a 540 ohm resistor 135 to a ground terminal G and a diode 136 is connected between the terminals G and F. A terminal O (for connection to the alternator output) is connected to the transistor base through a diode 137, a 10 ohm resistor 139 and a parallel circuit 140 including a 270 ohm resistor 141 and a 500 ohm variable resistor 142. A 540 ohm resistor 144 is connected between the terminal B and the junction of the diode 137 and the resistor 139. A 50 microfarad capacitor 145 is connected between the base and the emitter and a 0.1 microfarad capacitor 146 is connected between the emitter and collector.

Referring again to FIG. 11 in conjunction with FIG. 14, the terminal B of the regulator 14 is connected to the positive terminal of the battery 90 through the contacts 95 and the contacts 84 of the switch 38. When the contacts 95 are closed and the switch 38 is operated the battery voltage is impressed between the terminals B and G and divides between the resistors 144, 139, 135 and the parallel circuit 140 in proportion to their individual resistances. With only the battery voltage being applied to the regulator, the potential of the emitter (with respect to ground) is the full battery voltage while the potential at the base is less than half of the battery voltage. Since a PNP transistor conducts when its emitter is positive with respect to its base, the transistor is in a fully conducting condition and current flows through the emitter collector circuit to the alternator field.

When the alternator 11 is operating, its output voltage is divided between the resistors 139, 135 and the circuit 140. The voltage dropped across the resistor 135 by the alternator output adds to that dropped by the battery output and, as the alternator output increases, the base becomes more positive and the flow through the emitter collector circuit to the field winding of the alternator is decreased. The circuit 14 operates to maintain a constant voltage output at the terminal O of the alternator 11.

Without regulation, the voltage output of the alternator 11 would increase as the engine speed increases. The regulator 14 responds to any increase in alternator output voltage and correspondingly decreases the alternator field current to maintain the voltage delivered to the console at a constant value. The alternator 11 and the regulator 14 are designed so that a voltage of 24 volts is delivered to the heater elements 89 when the engine is running at idling speed or faster. The alternator may be any standard automotive alternator having a current capacity of about 35 amperes or more. Although the resistance of the network 88 is one half ohm at room temperature, as the elements 89 heat up, their resistances increase so that the total network resistance is about 0.7 ohms and network is drawing about 840 watts.

The network 88 represents the heater elements for the two toaster positions provided in the console, with each position receiving about 420 watts. This power is equal to that used in conventional household toasters for each slice position and therefore the system of the present invention will prepare food articles (packaged or unpackaged) in the same time required by household toasters.

Standard automotive alternators are available which produce up to at least 55 amperes. An alternator of this size regulated to have a constant 24 volt output would supply a total of 1320 watts. This power could be utilized to provide 440 watts to each of three toaster slice positions. A specially constructed larger capacity alternator could be employed if it were desired to provide four slice positions in the toaster. Thus, if desired, the toaster 17 could be equipped with three or four slice positions as indicated by the dot dash outline in FIGS. 3 and 9.

It will be seen that toaster elements 89 are isolated from the battery 90 so that the battery is not drained in the event the switch 38 is operated when the engine is not running.

Figure 12:
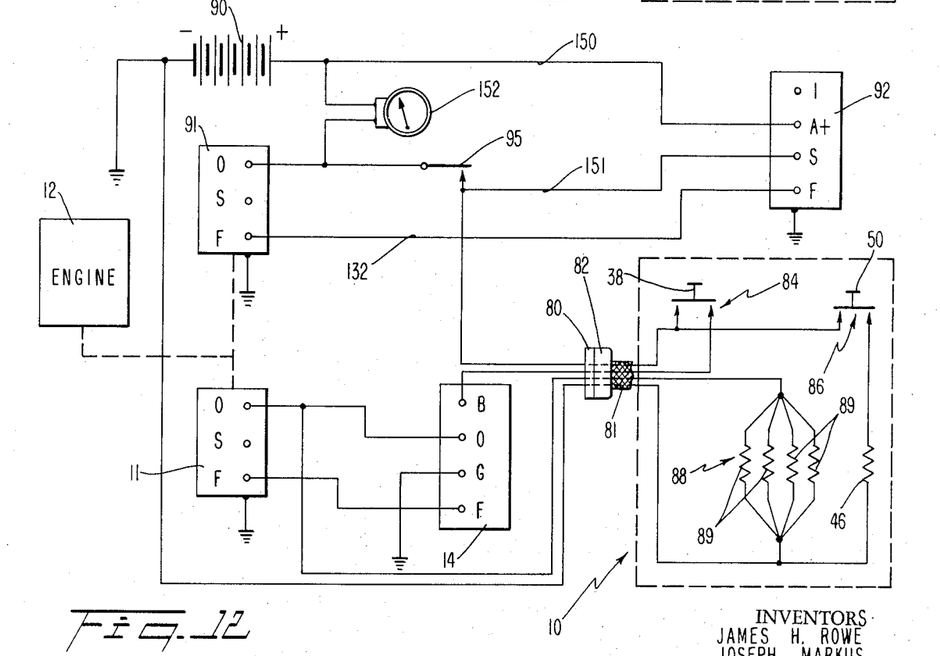
FIG. 12 is a schematic wiring diagram of the system of FIG. 11 interconnected with the electrical system of an automobile provided with an ammeter.

FIG. 12 shows the electrical generating apparatus of the present invention incorporated into the electrical system of an automobile equipped with an ammeter rather than an indicator lamp. In this arrangement, the positive terminal of the battery 90 is connected to the A+ terminal of the regulator 92 by a conductor 150, the output terminal O of the alternator 91 is connected to the S terminal of the regulator through the ignition switch contacts 95 and a conductor 151, and an ammeter 152 is connected between the positive terminal of the battery 90 and the terminal O of the alternator. With this arrangement when the contacts 95 are closed, the battery current energizes the coil 114 (FIG. 14) closing contacts 115 to allow current to flow through the regulator 92 (from the battery) to the field winding of the alternator 91. When the engine is running, the alternator 91 charges the battery 90 and supplies the field current flowing in the conductor 150. When the battery charges to a predetermined voltage, the relay coil 116 moves the contact 120 against the contact 118 removing the current flow to the field. The resulting drop in the alternator output de-energizes the relay coil and the cycle is repeated so that the contact 120 vibrates between contacts 117 and 118 to maintain an average output voltage sufficient to continue trickle charging the battery.

One side of each of the contacts 84 and 86 of the console switches is connected to the conductor 151 to supply current from the battery 90 to the field winding of the alternator 11 (through the regulator 14) and to the heater element 46 when the contacts 95 are closed. The construction, connection, and operation of the alternator 11, the regulator 14 and console 10 are the same as described in connection with FIG. 11.

Figure 10:
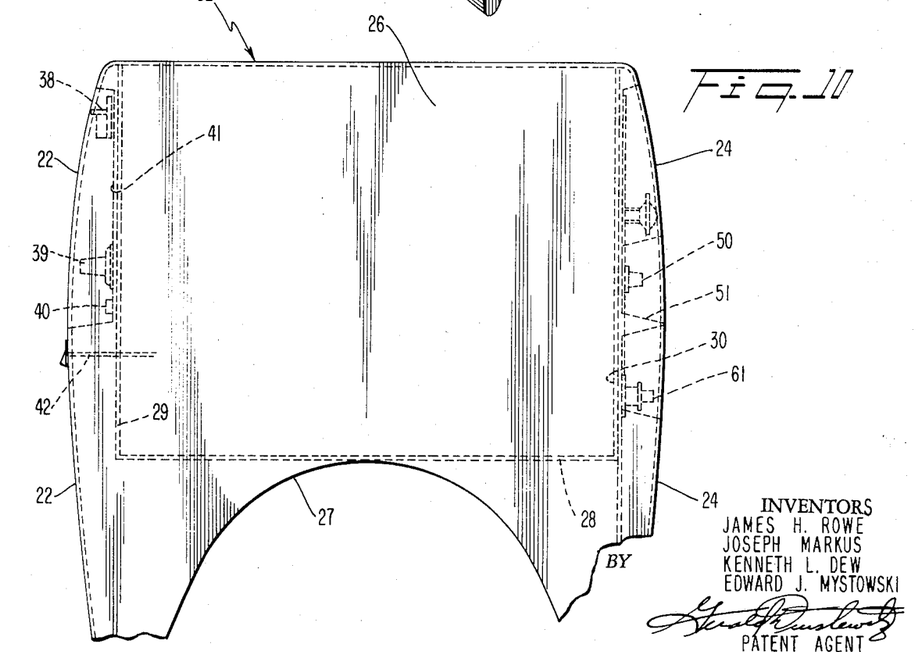
FIG. 10 is a front elevational view of the console showing the relative positions of various parts thereof.
Figures 16, 17, 18:
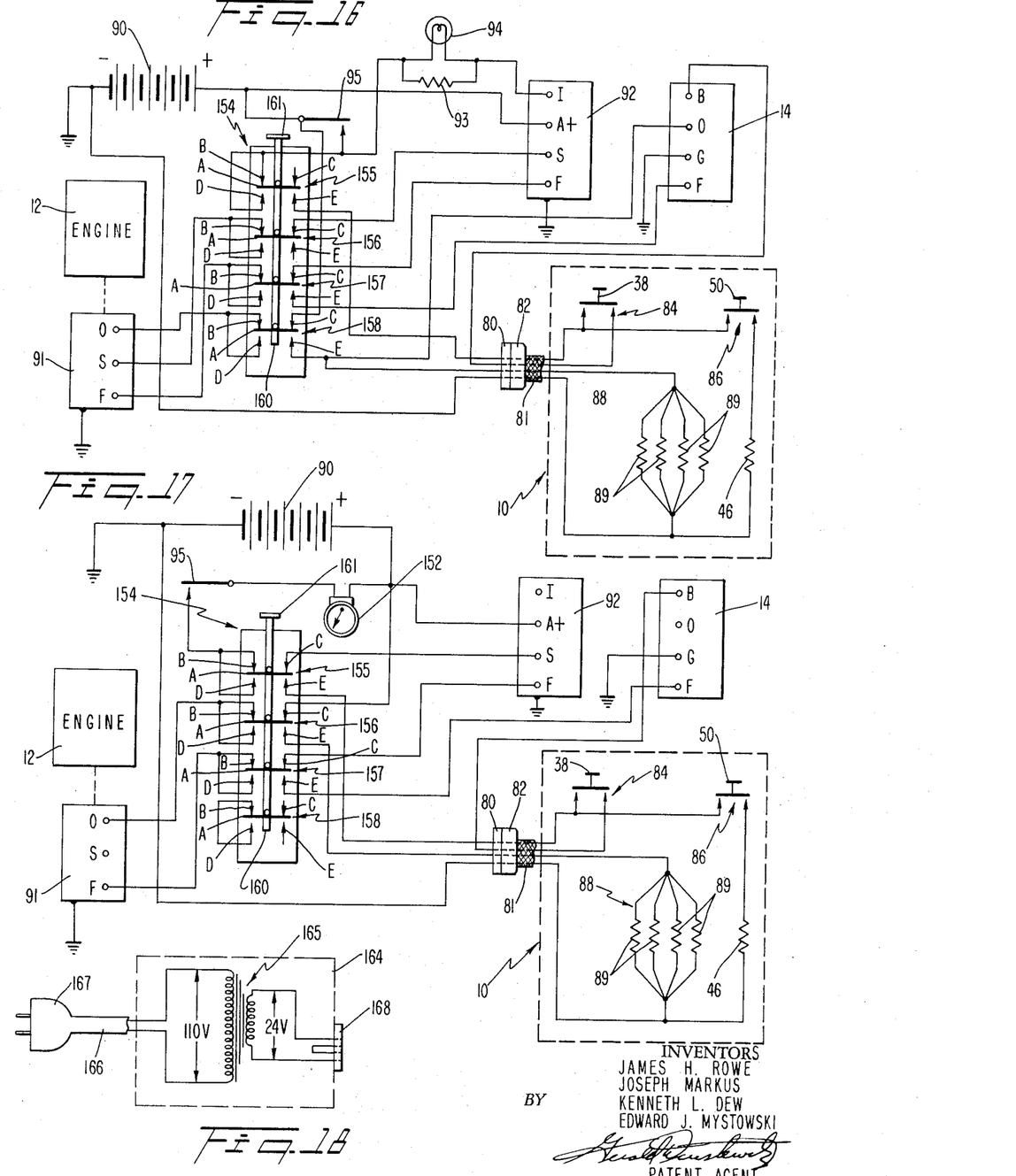
FIG. 16 is a schematic diagram of a modification of the system shown in FIG. 11 utilizing the existing alternator of the automobile.
FIG. 17 is a schematic diagram of the system of FIG. 16 incorporated into an automobile provided with an ammeter.
FIG. 18 is a schematic diagram of a unit for converting the console to household use.

In FIGS. 16 and 17 there are respectively shown modifications of the systems of FIGS. 10 and 11 wherein the alternator of the automobiles electrical system is also used for generating electricity for operating the console. In these modified systems, a manual switch 154 is provided (preferably mounted on the instrument panel) for transferring the alternator from one function to the other. In one position, the switch 154 connects the alternator 91 of FIGS. 16 and 17 to the auto's electrical system in the same manner as it is connected in FIGS. 10 and 11 respectively. In the other position, the switch connects the alternator 91 of FIGS. 16 and 17 in the same manner in which the alternator 11 of FIGS. 10 and 11 is connected.

The switch 154 has four sets of switch contacts 155 to 158, each including a moveable contact A a pair of stationary upper contacts B and C and a pair of stationary lower contacts D and E. The contacts B and D of each set of contacts are interconnected. The moveable contacts 155A to 158A are each mounted on a rod 160 which is provided with a handle 161. In the first position of the switch 154 the rod 160 is in its outer position and the contacts A interconnect the contacts B and C in each set to connect the alternator 91 to recharge the battery 90. In the second position, the rod is in its inner position and the contacts A interconnect the contacts B and C in each set to connect the alternator 91 to supply electrical power to the console 10.

In FIG. 16, the switch 154 is connected as follows: the contacts 155B and D are connected to the contacts 95; the contacts 156B and D, 157B and D and 158 B and D are respectively connected to the alternator terminals S, F, and o; the contacts 155C and 156E are not connected; the contact 155E is connected to the contacts 84 and 86 in the console; the contacts 156C and 157C are respectively connected to the terminals S and F of the regulator 92; the contacts 157E and 158E are respectively connected to the terminals F and O of the regulator 14, the heater network 88 in the console also being connected to the contact 158E; the contact 158C is connected to the positive terminal of the battery 90.

In FIG. 17, the switch 154 is connected as follows: the contacts 155B and D are connected to the contacts 95; the contacts 156B and D and 157 B and D are connected to the alternator terminals O and F respectively while the contacts 158B and D are unconnected; the contacts 155C, 156C and 157C are respectively connected to the regulator terminals S, A+, and F; the contact 155E is connected to contacts 84 and 86 in the console; the contact 156E is connected to the heater network 88; and the contacts 158C and E are unconnected.

With the systems of FIGS. 16 and 17, the rod 160 is kept in its outer position (with the A contacts bridging the B and C contacts) at all times except when it is desired to utilize the console 10. With the switch 154 in this position the alternator 91 supplies the electrical needs of the automobile. When it is desired to utilize the console, the rod 160 is moved inward and the alternator 91 is connected to supply the electrical needs of the console, while the battery 90 supplies the electrical demand of the auto's electrical circuit.

The console 10 may be removed from the automobile and utilized in a motel room, vacation bungalow, or the like with the aid of the convertor unit shown in FIG. 18. This unit includes a case 164, a step down transformer 165, a line cord 166 having a plug 167 connected to the primary winding of the transformer, and a four terminal outlet 168 mounted in the case 164 and having two terminals connected to the secondary of the transformer. The outlet 168 is identical to the outlet 80 mounted on the auto dash board and receives the four prong plug 82 on the console cable 81. One side of the transformer secondary is connected to the terminal of the outlet which receives the prong of the plug 82 connected to one side of both of the console switch contacts 84 and 86. The other side of the transformer secondary is connected to the terminal of outlet 168 which is connected to both the network 88 and the element 46. The remaining two terminals of the outlet 168 are interconnected to place the contacts 84 in series with the network 88. Therefore, when the plug 167 is inserted in a conventional wall outlet and the plug 82 is inserted in the outlet 168, the heater elements 89 and 46 are energized upon operation of the switches 38 or 50. A console with two toaster positions drawing 840 watts of electrical power, when connected to a 110 volt house current line will draw only approximately 8 amperes from that line and hence can be used wherever there is standard 110 volt wiring.

It will be seen from the foregoing that the present invention provides a practical food preparing system for passenger carrying conveyances which fulfills all of the objects of the invention previously set forth herein.

We claim:

1. A food preparing system for a passenger carrying conveyance having a passenger compartment and propelled by an engine comprising in combination an electrical generator driven by the engine and having a field and an output winding, cooking means within the passenger compartment connected to the generator output for converting the electrical output of the generator into radiant energy, a console housing said cooking means removeably positioned within said conveyance, an electrical connector connected to said console and detachable from said conveyance, said cooking means being connected directly to said output winding through said connector, a regulator connected to said field winding to control the output of the output winding by controlling the current flow through said field winding, and a switch on said console connected to interrupt the current flow in the field winding to turn said cooking means off and on.

2. A system according to claim 1 wherein said switch on said console is connected to said regulator through said connector.

3. A system according to claim 2 wherein said regulator and said switch are connected in series between said field winding and a battery supplying the field current.

4. A food preparing system for a passenger carrying conveyance having a passenger compartment and propelled by an engine provided with an electrical system including a battery, an electrical generator driven by the engine having a field winding and an output winding, for charging the battery and a voltage regulator for controlling the charging of the battery, the system comprising in combination a console within the passenger compartment, cooking means within said console for converting electrical energy into radiant energy, regulator means for sensing the output of said generator and controlling the electrical energy delivered to said cooking means, switch means within said passenger compartment having a first position for connecting the generator to the battery and to the voltage regulator and having a second position for connecting the output winding of the generator to said cooking means and connecting the field winding to the battery through said regulator means.

5. A system according to claim 4 including a switch on the console connected in series with said regulator means to interrupt the current flow in the field winding to turn said cooking means on and off.

6. A system according to claim 5 wherein said console is removeably positioned within said conveyance and an electrical connector is connected to said console for detaching said console from said conveyance, said cooking means being connected directly to said generator output winding through said connector, and said switch on said console being connected to the regulator through said connector.

* * * * *